US012808264B2

(12) United States Patent
Matsuda et al.

(10) Patent No.: US 12,808,264 B2
(45) Date of Patent: Nov. 24, 2026

(54) HYDRAULIC HAMMERING DEVICE

(71) Applicant: Furukawa Rock Drill Co., Ltd., Tokyo (JP)

(72) Inventors: Toshio Matsuda, Gunma (JP); Tomohiro Goto, Gunma (JP); Seiya Onodera, Gunma (JP)

(73) Assignee: Furukawa Rock Drill Co., Ltd., Tokyo (JP)

( * ) Notice: Subject to any disclaimer, the term of this patent is extended or adjusted under 35 U.S.C. 154(b) by 0 days.

(21) Appl. No.: 19/117,882

(22) PCT Filed: Oct. 3, 2023

(86) PCT No.: PCT/JP2023/036105
§ 371 (c)(1),
(2) Date: Apr. 2, 2025

(87) PCT Pub. No.: WO2024/075745
PCT Pub. Date: Apr. 11, 2024

(65) Prior Publication Data

US 2026/0125951 A1 May 7, 2026

(30) Foreign Application Priority Data

Oct. 5, 2022 (JP) ................................ 2022-161071

(51) Int. Cl.
*E21B 1/26* (2006.01)
*B25D 9/12* (2006.01)
*B25D 17/24* (2006.01)

(52) U.S. Cl.
CPC .................. *E21B 1/26* (2020.05); *B25D 9/12* (2013.01); *B25D 17/245* (2013.01); *B25D 2217/0073* (2013.01); *B25D 2222/72* (2013.01)

(58) Field of Classification Search
CPC ........... E21B 1/26; B25D 9/12; B25D 17/245; B25D 2217/0073; B25D 2222/72
See application file for complete search history.

(56) References Cited

U.S. PATENT DOCUMENTS 5,896,937 A 4/1999 Kaneko
2015/0129269 A1* 5/2015 Muuttonen ............... E21B 1/04 173/206
2019/0210205 A1* 7/2019 Kaneko ................ B25D 17/245

FOREIGN PATENT DOCUMENTS

JP H09-109064 A 4/1997
WO 2017/110793 A1 6/2017

OTHER PUBLICATIONS

International Preliminary Report on Patentability in PCT/JP2023/036105, with its English translation, transmitted Mar. 1, 2025, 11 pgs.

(Continued)

*Primary Examiner* — Michelle Lopez
(74) *Attorney, Agent, or Firm* — Young Basile Hanlon & MacFarlane, P.C.

(57) ABSTRACT

A hydraulic hammering device includes a dual damper including a pushing piston, a damping piston, a pushing chamber configured to generate a propulsive force in the pushing piston (5), a damping chamber configured to generate a propulsive force in the damping piston, and a drain circuit provided in constant isolation from the pushing chamber and the damping chamber and configured to return hydraulic fluid leaked from locations of sliding contact of the pistons to a tank. A first throttle is interposed in the drain circuit. Only a check valve configured to, while allowing supply of hydraulic fluid from the high-pressure circuit to the pushing chamber, restrict an outflow of hydraulic fluid in the reverse direction is provided in a pushing passage connecting the pushing chamber and a high-pressure circuit.

(Continued)

Only a second throttle is provided in a damping passage connecting the damping chamber and the high-pressure circuit.

9 Claims, 7 Drawing Sheets

(56) References Cited

OTHER PUBLICATIONS

European Search Report for Application No. 23874872.7, dated Jan. 2, 2026, 7 pgs.
Australian Office Action for Application No. 2023357676, dated Feb. 6, 2026, 2 pgs.
Japanese Office Action for Application No. 2022-161071, dated Jan. 4, 2023, with English translation, 11 pages.
Japanese Office Action for Application No. 2022-161071, dated Jul. 11, 2023, with English translation, 9 pages.
International Search Report in PCT/JP2023/036105, mailed Dec. 19, 2023, and its English translation, 4 pgs.

* cited by examiner

HYDRAULIC HAMMERING DEVICE

TECHNICAL FIELD

Embodiments of the present invention relate to a hydraulic hammering device, such as a rock drill and a breaker, for crushing bedrock and the like by delivering blows to a tool, such as a rod and a chisel.

BACKGROUND

A drilling machine crushes bedrock R, which is a crushing target, by delivering blow energy generated in a hammering mechanism 3 of a rock drill main body 1 to a tool including a shank rod 2, a rod 22, and a bit 21, as illustrated in a basic configuration in FIGS. 1A to 1C. The rock drill main body 1 is constantly provided with a propulsive force toward the bedrock R by a known feed mechanism, and the bit penetrates deep into the bedrock R while crushing the bedrock R and drills a blast hole BH.

Not all of the blow energy is consumed for crushing the bedrock R, and a portion of the blow energy bounces back from the bedrock R as reflected energy Er. The reflected energy Er on this occasion is transmitted from the bit 21 to the rock drill main body 1 by way of the rod 22 and the shank rod 2, and the reflected energy causes damage to a constituent device, such as the rock drill main body 1 or the shank rod 2, and also becomes a factor causing reduction in drilling efficiency.

Therefore, the applicants have developed a "dual damper" from early on as an effective means to counter the reflected energy Er and have improved the dual damper from day to day (see Patent Publication Nos. JP H09-109064 A and WO 2017/110793).

A dual damper 4 includes a pushing piston 5 and a damping piston 6 as major constituent components, and a throttle 90 is provided in a high-pressure circuit 7, and check valves 91 and 92 are provided in a pushing passage 71 and a damping passage 72, respectively, as illustrated in a prior art in FIG. 6.

The dual damper 4 achieves at the same time both a "cushioning action" to damp the reflected energy Er and thereby protect the rock drill main body 1 from being damaged and a "pushing action" to stably press the bit 21 against the bedrock R to transmit blow energy to the bedrock without loss, at a high level.

Because a detailed configuration of other constituent components and a mechanism of action of the dual damper 4 are described in detail in JP H09-109064 A and WO 2017/110793 (in particular, paragraphs 0070 to 0072 and FIG. 6), description thereof will be omitted herein.

As used herein, the term "tool" may be synonymous with the bit (21), and the term "transmission members" may be a term collectively referring to a group of members including the rod (22), a sleeve (23), the shank rod (2), and a bush (12). Note that, although a description is omitted herein, when the hydraulic hammering device is a breaker, the rod (or the chisel) functions as both a "tool" and a "transmission member".

SUMMARY

However, there is room for improvement in the dual damper.

That is, there have been cases where in a hydraulic hammering device capable of delivering a large number of blows by increasing the number of blows, response speed of the dual damper is insufficient such that the cushioning action and the pushing action are not sufficiently exerted. In addition, there is a case where when an operating condition for the hydraulic hammering device is not properly controlled according to conditions of the bedrock R, and again the cushioning action and the pushing action are not sufficiently exerted.

Accordingly, the present invention has been made in view of the problem in a hydraulic hammering device as described above, and an object of the present invention is to provide a hydraulic hammering device that is capable of exerting a cushioning action and a pushing action of a dual damper under various conditions.

FIRST EMBODIMENT

To achieve the object mentioned above, according to a first embodiment of the invention, there is provided a hydraulic hammering device including: a transmission member configured to transmit a propulsive force toward a crushing target side to a tool; a hammering mechanism configured to strike a blow on a rear portion of the transmission member; a pushing piston disposed immediately behind the transmission member, the pushing piston having a smaller propulsive force than a propulsive force of a device main body of the hydraulic hammering device; a damping piston positioned behind the pushing piston and disposed to slide reciprocally against the pushing piston in forward and backward directions, the damping piston having a greater propulsive force than the propulsive force of the device main body of the hydraulic hammering device; a pushing chamber configured to generate a propulsive force in the pushing piston; a damping chamber configured to generate a propulsive force in the damping piston; a damper pressure source configured to supply the pushing chamber and the damping chamber with hydraulic fluid by way of a high-pressure circuit; a drain circuit provided in constant isolation from the pushing chamber and the damping chamber and configured to discharge a leakage of hydraulic fluid from a location of sliding contact between the pushing piston and the damping piston to a tank; a first throttle interposed in the drain circuit; a pushing passage connecting the pushing chamber and the high-pressure circuit; and a damping passage connecting the damping chamber and the high-pressure circuit, wherein in a supply path of hydraulic fluid including the high-pressure circuit and the pushing passage, only a check valve configured to, while allowing supply of hydraulic fluid from the damper pressure source to the pushing chamber, restrict an outflow of hydraulic fluid from the pushing chamber to the damper pressure source is provided, and in a supply path of hydraulic fluid including the high-pressure circuit and the damping passage, only a second throttle is provided.

According to the hydraulic hammering device of the first embodiment, because in the supply path of hydraulic fluid including the high-pressure circuit and the pushing passage, only the check valve configured to, while allowing supply of hydraulic fluid from the damper pressure source to the pushing chamber, restrict an outflow of hydraulic fluid from the pushing chamber to the damper pressure source is provided and in the supply path of hydraulic fluid including the high-pressure circuit and the damping passage, only the second throttle is provided, operational responses of the pushing piston and the damping piston are improved. As a result, a cushioning action and a pushing action can be exerted at a high level. That is, the first embodiment is suitable for a hydraulic hammering device capable of delivering a large number of blows.

SECOND EMBODIMENT

In addition, in a hydraulic hammering device of a second embodiment of the invention, after the hammering mechanism strikes a blow on the transmission member, the pushing piston advances following the transmission member, the transmission member advancing preceding the pushing piston, and when reflected energy propagating from the tool to a device main body of the hydraulic hammering device arrives at the pushing piston, the pushing piston and the damping piston are separated from each other.

According to the hydraulic hammering device of the second embodiment, after the hammering mechanism strikes a blow on the transmission member, the pushing piston advances following the transmission member, the transmission member advancing preceding the pushing piston, and when reflected energy propagating from the tool to the main body of the hydraulic hammering device arrives at the pushing piston, the pushing piston and the damping piston are separated from each other.

Therefore, the pushing piston is caused to separately receive the transmission tool that is to retract due to propagation of reflected energy, retract, and exert a first cushioning action. Subsequently, the pushing piston and the damping piston are caused to retract in one body and exert a second cushioning action.

Although during a time for which the transmission tool performs idle running during retraction (hereinafter, referred to as a retraction idle running time), a cushioning action is not exerted, the dual damper can exert a cushioning action without delay as a whole. This is because, according to the second embodiment, the retraction idle running time is reduced by a time for which the first cushioning action is exerted.

The second embodiment is suitable for a phase in which the pushing piston and the damping piston advance and retract in one body, that is, in a phase in which the dual damper advances and retracts in a region on a negative displacement side, which will be described later.

In particular, because in a state in which an advancing propulsive force of the rock drill main body is dominant over an advancing propulsive force of the dual damper (hereinafter, referred to as a feed-dominant state), the dual damper advances and retracts in the region on the negative displacement side in all phases in which first reflected energy, that is, a first wave of reflected energy, propagates and second and subsequent waves of reflected energy propagate, the second embodiment is suitable for the hydraulic hammering device in the feed-dominant state.

Note that in the second embodiment, a mechanism in which the pushing piston and the damping piston are separated from each other when reflected energy arrives at the pushing piston is achieved by an improvement in a response when the pushing piston advances among improvement in operational responses of the pushing piston and the damping piston, which is an advantageous effect of the first embodiment. Therefore, it is evident that a pushing action that is an original function of the pushing piston is also improved.

THIRD EMBODIMENT

In addition, in a hydraulic hammering device of a third embodiment of the invention, after the hammering mechanism strikes a blow on the transmission member, only the pushing piston advances relative to the damping piston that stops at an advancing stroke end, such that the pushing piston follows the transmission member, the transmission member advancing preceding the pushing piston, and before a timing when first reflected energy propagating from the tool to a device main body of the hydraulic hammering device arrives at the pushing piston, the pushing piston comes into contact with a rear portion of the transmission member and presses the transmission member.

According to the hydraulic hammering device of the third embodiment, after the hammering mechanism strikes a blow on the transmission member, only the pushing piston advances following the transmission member, the transmission member advancing preceding the pushing piston, relative to the damping piston, which stops at the advancing stroke end, and before a timing when first reflected energy propagating from the tool to the device body of the hydraulic hammering device arrives at the pushing piston, the pushing piston comes into contact with a rear portion of the transmission member and presses the transmission member.

Therefore, the pushing piston is caused to separately receive the transmission tool, which is to retract due to propagation of reflected energy, while the pushing piston is in contact with the transmission tool, retract, and exert a first cushioning action. Subsequently, the pushing piston and the damping piston are caused to retract in one body and exert a second cushioning action.

Therefore, the retraction idle running time of the transmission tool during which a cushioning action is not exerted is eliminated, and the dual damper can exert a cushioning action further without delay as a whole.

In particular, because in a state in which the advancing propulsive force of the dual damper is dominant over the advancing propulsive force of the rock drill main body (hereinafter, referred to as a damper-dominant state), and a state in which the advancing propulsive force of the dual damper is proper with respect to the advancing propulsive force of the rock drill main body (hereinafter, referred to as a damper-proper state), the pushing piston advances and retracts while largely protruding into a region on the positive displacement side, which will be described later, relative to the damping piston in a phase in which the first wave of reflected energy propagates, the third embodiment is suitable for the hydraulic hammering device in the damper-dominant state and the damper-proper state.

Note that in the third embodiment, a mechanism in which before a timing when the first reflected energy arrives at the pushing piston, the pushing piston comes into contact with the rear portion of the transmission member and presses the transmission member is achieved by a more prominent improvement in a response when the pushing piston advances among improvement in operational responses of the pushing piston and the damping piston, which is an advantageous effect of the first embodiment. Therefore, it is evident that in the third embodiment, the pushing action that is the original function of the pushing piston has also been considerably improved.

Incidentally, the third embodiment is made by focusing only on a relation between the first wave of reflected energy and the pushing piston, and no relation between the second and subsequent waves of reflected energy and the pushing piston is defined.

This is because the first wave of reflected energy is extremely large compared to the second and subsequent waves of reflected energy. To cause the entire reflected energy to die out in a short period of time, it is most important to cushion the first wave of reflected energy without a time lag.

As discussed above, according to the present invention, it is possible to provide a hydraulic hammering device that is capable of exerting a cushioning action and a pushing action of a dual damper under various conditions.

DETAILED DESCRIPTION

Hereinafter, embodiments of the present invention will be described with reference to the drawings as appropriate. Note that the same constituent components as or corresponding constituent components to those in the above-described prior art or a known structure are designated by the same reference signs and detailed description thereof will be omitted as appropriate. In addition, the drawings are schematic. Therefore, it should be noted that relations between thicknesses and planar dimensions, ratios, and the like are different from actual ones and portions having different dimensional relationships and ratios from one another among the drawings are included.

In addition, the following embodiments indicate devices and methods to embody the technical idea of the present invention by way of example, and the materials, shapes, structures, arrangements, and the like of the constituent components are not limited to those described below.

Basic Configuration

Figure 1A:
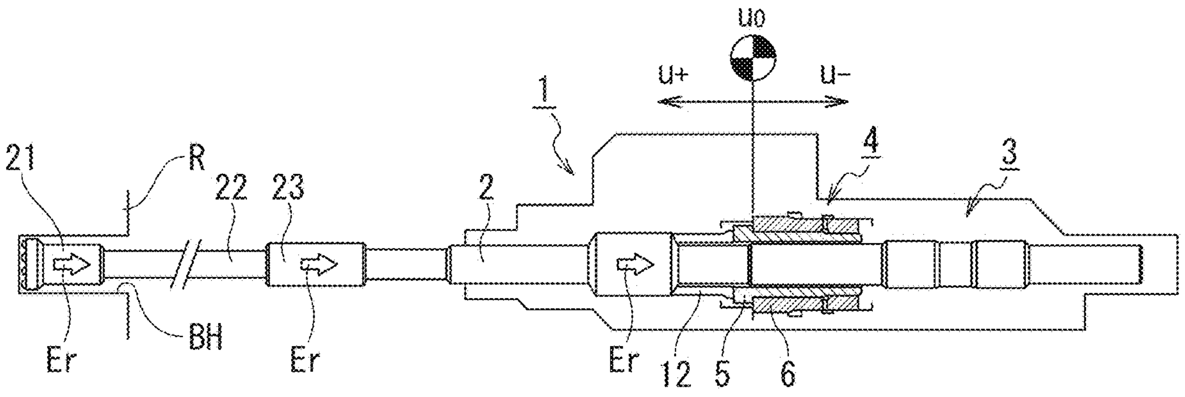
FIGS. 1A to 1C are explanatory diagrams of a basic configuration a rock drill indicative of one embodiment of a hydraulic hammering device according to the present invention, and illustrate a state in which a pushing piston and a damping piston come into contact with each other and the damping piston is positioned at a front stroke end thereof at the time of striking (a damper-proper state), a state in which the pushing piston has advanced relative to the damping piston at the time of striking (a damper-dominant state), and a state in which both the pushing piston and the damping piston have retracted at the time of striking (a feed-dominant state), respectively.
Figure 1B:
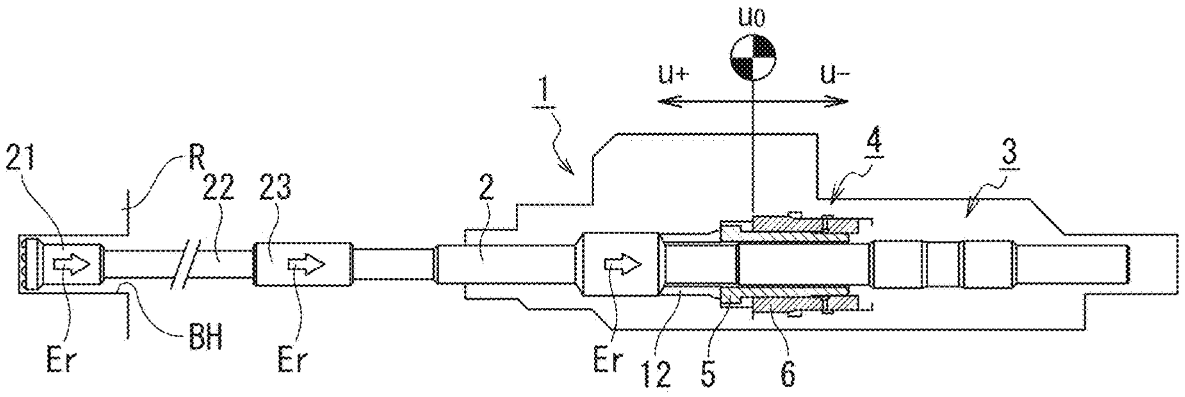
Figure 1C:
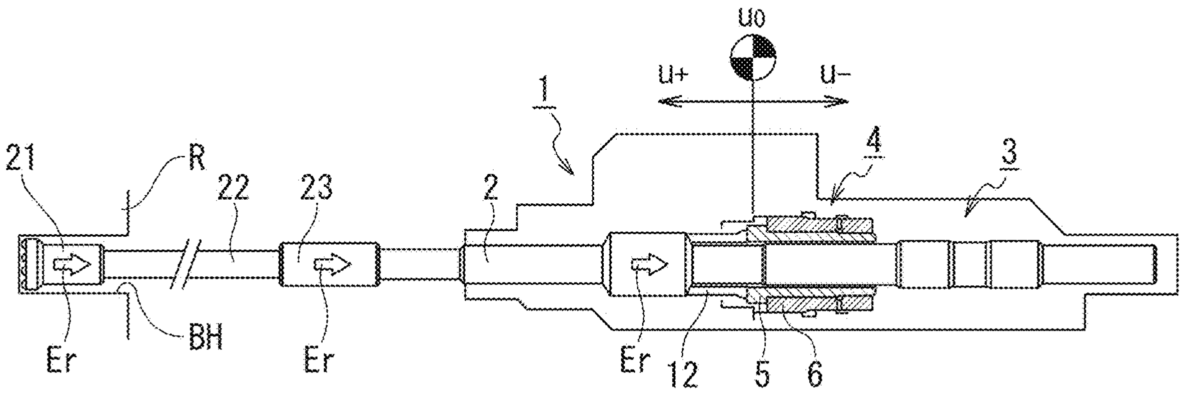

In a basic configuration of a rock drill of the present embodiment, as illustrated in FIGS. 1A to 1C, a shank rod 2 is inserted into a front end section of a rock drill main body 1 and a hammering mechanism 3 for delivering a blow to the shank rod 2 is disposed behind the shank rod 2. A rod 22 having a bit 21 for drilling attached thereto is connected to the shank rod 2 by means of a sleeve 23.

The rock drill main body 1 includes a known chuck driver (not illustrated) that provides rotation to the shank rod 2 through a known chuck (not illustrated).

Figure 2:
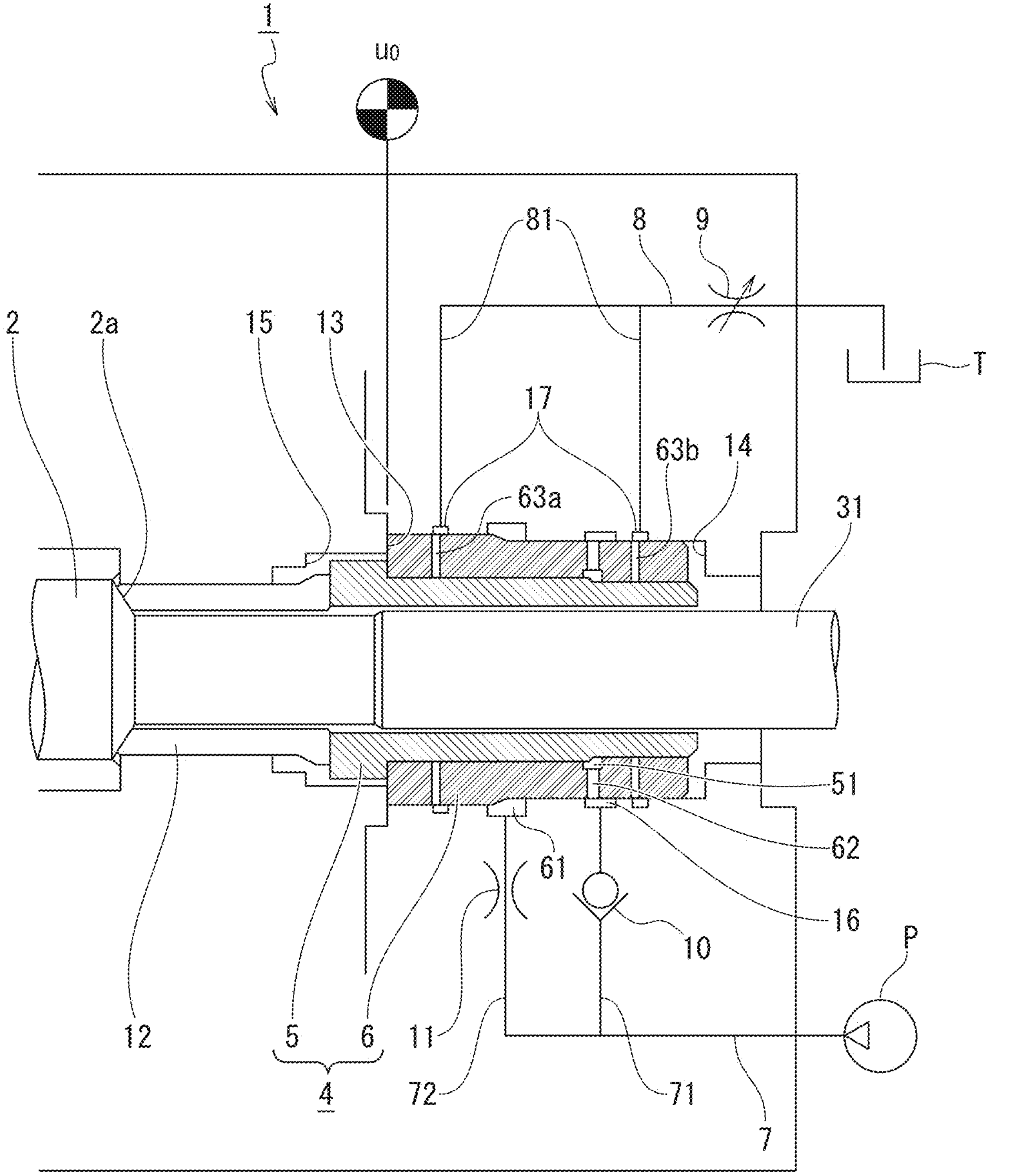
FIG. 2 is a longitudinal sectional view of a cushioning mechanism of the rock drill indicative of an embodiment of the present invention.

To the chuck driver, a bush 12 that comes into contact with a large diameter section rear end 2*a* of the shank rod 2 is held slidably in the forward and backward directions inside the chuck driver, as illustrated in FIG. 2. A pushing piston 5 and a damping piston 6 are disposed behind the bush 12 and form a dual damper 4.

A middle step section 13, a rear step section 14, and a front step section 15 are formed on the rock drill main body 1. The damping piston 6 is a cylindrical piston and is held movable in the forward and backward directions between the middle step section 13 and the rear step section 14. In the damping piston 6, a fluid feeding hole 62 and drain holes 63*a* and 63*b* are formed. An annular pushing chamber 51 is formed on the inner diameter side of the fluid feeding hole 62.

The pushing piston 5 is a flanged cylindrical piston and is held movable in the forward and backward directions between the front step section 15 and a front end face of the damping piston 6. An outer diameter surface of the pushing piston 5 and an inner diameter surface of the damping piston 6 are in sliding contact with each other.

Note that a position of the middle step section 13 is defined as a reference position u0 of movement of the dual damper 4 and displacements on a front side and a rear side of the reference position u0 are assumed to be positive displacement u+ and negative displacement u−, respectively.

On an inner peripheral surface of the rock drill main body 1, a pushing port 16 is formed at a position facing the fluid feeding hole 62 of the damping piston 6. On the inner peripheral surface of the rock drill main body 1, drain ports 17 are formed in the front and rear of the pushing port 16. Further, on the inner peripheral surface of the rock drill main body 1, a damping chamber 61 is formed between the pushing port 16 and a front drain port 17.

To the rock drill main body 1, a hydraulic pump P serving as a damper pressure source is connected by way of a high-pressure circuit 7, and a tank T is also connected by way of a drain circuit 8.

In the present embodiment, one end of the high-pressure circuit 7 is connected to the hydraulic pump P and the other end splits into a pushing passage 71 and a damping passage 72, respectively. The pushing passage 71 and the damping passage 72 are connected to the pushing port 16 and the damping chamber 61, respectively.

In the above configuration, only a check valve 10 is interposed in the pushing passage 71 as a hydraulic fluid control element. The check valve 10 is provided as a direction-restricting means for, while allowing an inflow of hydraulic fluid from the side on which the hydraulic pump P is placed to the side on which the pushing port 16 is formed, restricting an outflow of hydraulic fluid from the side on which the pushing port 16 is formed to the side on which the hydraulic pump P is placed.

In addition, only a throttle 11 is interposed in the damping passage 72 as a hydraulic fluid control element. The throttle 11 is provided as a direction-restricting means for, while allowing an inflow of hydraulic fluid from the side on which the hydraulic pump P is placed to the side on which the damping chamber 61 is formed, restricting an outflow of hydraulic fluid from the side on which the damping chamber 61 is formed to the side on which the hydraulic pump P is placed.

That is, while resistance of hydraulic fluid passing through a throttle increases in proportion to a square of flow velocity, the throttle 11 of the present embodiment acts as a direction-restricting means because outflow velocity is higher than inflow velocity.

As described in the foregoing, in the present embodiment, hydraulic fluid is supplied from an outlet for hydraulic fluid of the hydraulic pump P to the pushing chamber 51 by way of the high-pressure circuit 7 and the pushing passage 71. Further, only the check valve 10 is interposed in the pushing passage 71. In other words, in the pushing passage 71 that is a supply path of hydraulic fluid to the pushing chamber 51, only the check valve 10 is interposed as a hydraulic fluid control element.

In addition, in the present embodiment, hydraulic fluid is supplied from the outlet for hydraulic fluid of the hydraulic pump P to the damping chamber 61 by way of the high-pressure circuit 7 and the damping passage 72. Further, only the throttle 11 is interposed in the damping passage 72. In other words, in the damping passage 72 that is a supply path of hydraulic fluid to the damping chamber 61, only the throttle 11 is interposed as a hydraulic fluid control element.

Note that an embodiment may be configured such that a decompression means is disposed between the outlet for hydraulic fluid of the hydraulic pump P and the high-pressure circuit 7. This configuration is a configuration in which a damper pressure source is formed by the hydraulic pump P and the decompression means.

The tank T is connected to one end of the drain circuit 8, and the other end of the drain circuit 8 splits into drain passages 81. The drain passages 81 are connected to the drain ports 17. A variable throttle 9 is interposed in the drain circuit 8. Note that the variable throttle 9 constitutes a "first throttle" in the present embodiment, and the throttle 11 constitutes a "second throttle" in the present embodiment.

When a forward propulsive force that is provided to the rock drill main body 1 by a feed mechanism is denoted by F1, and propulsive forces when the pushing piston 5 and the damping piston 6 advance by hydraulic fluid supplied from the side on which the hydraulic pump P is placed to the sides on which the pushing chamber 51 and the damping chamber 61 are formed by the above-described configuration are denoted by F5f and F6f, respectively, a relationship among F1, F5f, and F6f is set to satisfy formula (1) below.

$$F5f<F1<F6f \quad (1)$$

States of Dual Damper

Next, a damper-proper state, a damper-dominant state, and a feed-dominant state of the dual damper will be described.

When a relationship among propulsive forces of the dual damper 4 and a propulsive force of the rock drill main body 1 is maintained according to formula (1), the pushing piston 5 retracts, and a rear end of the pushing piston 5 comes into contact with a front end of the damping piston 6. The damping piston 6 advances. and the front end of the damping piston 6 comes into contact with the middle step section 13 and comes to a stop.

That is, when a striking piston 31 strikes a blow on the shank rod 2, the rear end of the pushing piston 5 and the front end of the damping piston 6 come into contact with each other, and a contact surface therebetween is positioned at the reference position u0. This state is defined as the damper-proper state of the dual damper 4 (FIG. 1A).

There is a case where in the relationship among the propulsive forces of the dual damper 4 and the propulsive force of the rock drill main body 1, the propulsive forces of the dual damper 4 are more dominant than the propulsive force of the rock drill main body 1. Examples of such a case include where pressure of hydraulic fluid supplied to the feed mechanism is intentionally set to a pressure lower than a proper pressure to prevent a curved hole from being generated in bedrock having many cracks.

In this case, a behavior in which the damping piston 6 advances and comes to a stop with the front end thereof coming into contact with the middle step section 13 is the same as that in the damper-proper state. On the other hand, the pushing piston 5 separates from the damping piston 6, advances, and comes into contact with the shank rod 2. On this occasion, because the advancing speed of the rock drill main body 1 is low, the pushing piston 5 and the damping piston 6 are maintained separated from each other.

That is, when the striking piston 31 strikes a blow on the shank rod 2, the rear end of the pushing piston 5 is located at a position where the rear end has advanced away from the reference position u0. This state is defined as the damper-dominant state of the dual damper 4 (FIG. 1B). A state in which the pushing piston 5 is in contact with the front step section 15, which is an advancing stroke end of the pushing piston 5, is illustrated in FIG. 1B for descriptive purposes. In actuality, separation distance between the pushing piston 5 and the damping piston 6 is extremely small.

There is a case where in the relationship among the propulsive forces of the dual damper 4 and the propulsive force of the rock drill main body 1, the propulsive force of the rock drill main body 1 is more dominant (e.g., greater propulsive force) than the propulsive forces of the dual damper 4. Examples of such a case include where rock quality becomes soft, repulsion from the bedrock decreases, and the propulsive force of the rock drill main body 1 becomes relatively excessive while a drilling operation is performed with the pressure of hydraulic fluid to be supplied to the feed mechanism is set to a proper pressure.

In this case, the pushing piston 5 comes into contact with the damping piston 6. Further, the pushing piston 5 and the damping piston 6 retract in one body and come to a stop at a position where the propulsive force of the damping piston 6 and a reactive force of the propulsive force of the rock drill main body 1 are balanced.

That is, when the striking piston 31 strikes a blow on the shank rod 2, the front end of the damping piston 6 is located at a position where the front end has retracted beyond the reference position u0. This state is defined as the feed-dominant state of the dual damper 4 (FIG. 1C). A state in which the damping piston 6 is in contact with the rear step section 14, which is a retracting stroke end of the damping piston 6, is illustrated in FIG. 1C for descriptive purposes. In actuality, the retracting stopping distance of the damping piston is small.

Next, operation of the rock drill main body 1 and the dual damper 4 will be described with respect to a cushioning action and a pushing action in this order.

Cushioning Action

As illustrated in FIGS. 1A to 1C, in a drilling operation, when the striking piston 31 of the hammering mechanism 3 strikes a blow on the shank rod 2, blow energy of the striking piston 31 is transmitted from the shank rod 2 to the bit 21 by way of the rod 22, and the bit 21 penetrates and crushes bedrock R, which is a crushing target. On this occasion, the pushing piston 5 advances following the shank rod 2. Reflected energy Er is transmitted from the bit 21 to the dual damper 4 by way of the rod 22, the shank rod 2, and the bush 12 and is cushioned.

When the reflected energy Er is transmitted to the dual damper 4, first, the pushing piston 5 separately retracts and comes into contact with the damping piston 6, and subsequently, the pushing piston 5 and the damping piston 6 retract in one body relatively with respect to the rock drill main body 1.

When the damping piston 5 separately retracts, hydraulic fluid in the pushing chamber 51 has the pressure thereof raised because an outflow thereof to the side on which the hydraulic pump P is placed is restricted by the check valve 10 and leaks accompanied by heat generation from clearance at a location of sliding contact.

When the damping piston 6 retracts, hydraulic fluid in the damping chamber 61 has the pressure thereof raised because an outflow thereof to the side on which the hydraulic pump P is placed is restricted by the throttle 11 and leaks accompanied by heat generation from clearance at a location of sliding contact. Note that when the pushing piston 5 and the damping piston 6 retract in one body, hydraulic fluid does not flow out from the pushing chamber 51.

Because the hydraulic fluid having leaked from the clearance at the locations of sliding contact is collected to the tank T with heat energy retained, the reflected energy Er is damped by consuming energy equivalent to the heat energy.

On this occasion, while the leaking hydraulic fluid is discharged to the tank T by way of the drain ports 17, the drain passages 81, and the drain circuit 8, the variable throttle 9 is interposed in the drain circuit 8 and controls the upper limit of the amount of leakage of the leaking hydraulic fluid, that is, the amount of consumed fluid in the dual damper 4.

As described above, because the dual damper 4 of the present invention constantly exerts a cushioning action in each of the damper-proper state, the damper-dominant state, and the feed-dominant state, it is possible to prevent damage to the rock drill main body 1, a tool, and the transmission members.

When reactive forces when the pushing piston 5 and the damping piston 6 retract, that is, cushioning propulsive forces, are denoted by F5r and F6r, respectively, because a forward propulsive force of the rock drill main body 1 is F1 as described above and a reactive force from the bedrock is thus equally F1, a relationship among F1, F5r, and F6r is set to a relationship between the formulae (2) and (3) below by setting the amount of adjustment of the variable throttle 9.

Degree of Opening of Variable Throttle 9: Maximum $$F1 < F5r < F6r \tag{2}$$

Degree of Opening of Variable Throttle 9: Full Close $$F1 < F5r = F6r \tag{3}$$

Pushing Action

The rock drill main body 1, which temporarily retracted due to the reflected energy Er from the bedrock R, advances until reaching a state in which the bit 21 comes into contact with the bedrock R, that is, to a predetermined striking position by the time a next strike is performed.

On this occasion, because the total mass of the transmission members including the tool is substantially smaller than the mass of the rock drill main body 1, the pushing piston 5 and the damping piston 6 advance more rapidly than the rock drill main body 1, advance until reaching an advancing stroke end of the damping piston 6, that is, until the dual damper 4 is brought into the damper-proper state, and come to a stop.

If the bit 21 has not come into contact with the bedrock R at the time when the damping piston 6 reaches the advancing stroke end, the pushing piston 5 (e.g. a damping piston positioned behind the pushing piston and disposed to slide reciprocally against the pushing piston in forward and backward directions), separating from the damping piston 6, advances and brings the bit 21 into contact with the bedrock R by means of the transmission members (e.g., the pushing piston is disposed immediately behind the transmission member).

While pushing action of a conventional dual damper brings the bit 21 into close contact with the bedrock R on this occasion, the pushing action of the dual damper 4 of the present embodiment is reinforced because operational responses of the pushing piston 5 and the damping piston 6 have been improved.

Although subsequently, the rock drill main body 1 advances, the hammering mechanism 3 strikes a next blow in one of the damper-proper state, the damper-dominant state, or the feed-dominant state according to a setting of a propulsive force of the rock drill main body 1 with respect to characteristics of the bedrock R and a relative relationship between a propulsive force of the rock drill main body 1 and propulsive forces of the dual damper 4, as described before.

Reflected Energy and Displacement of Dual Damper

Next, a manner in which the dual damper 4 cushions transmitted reflected energy Er will be described.

Figure 3:
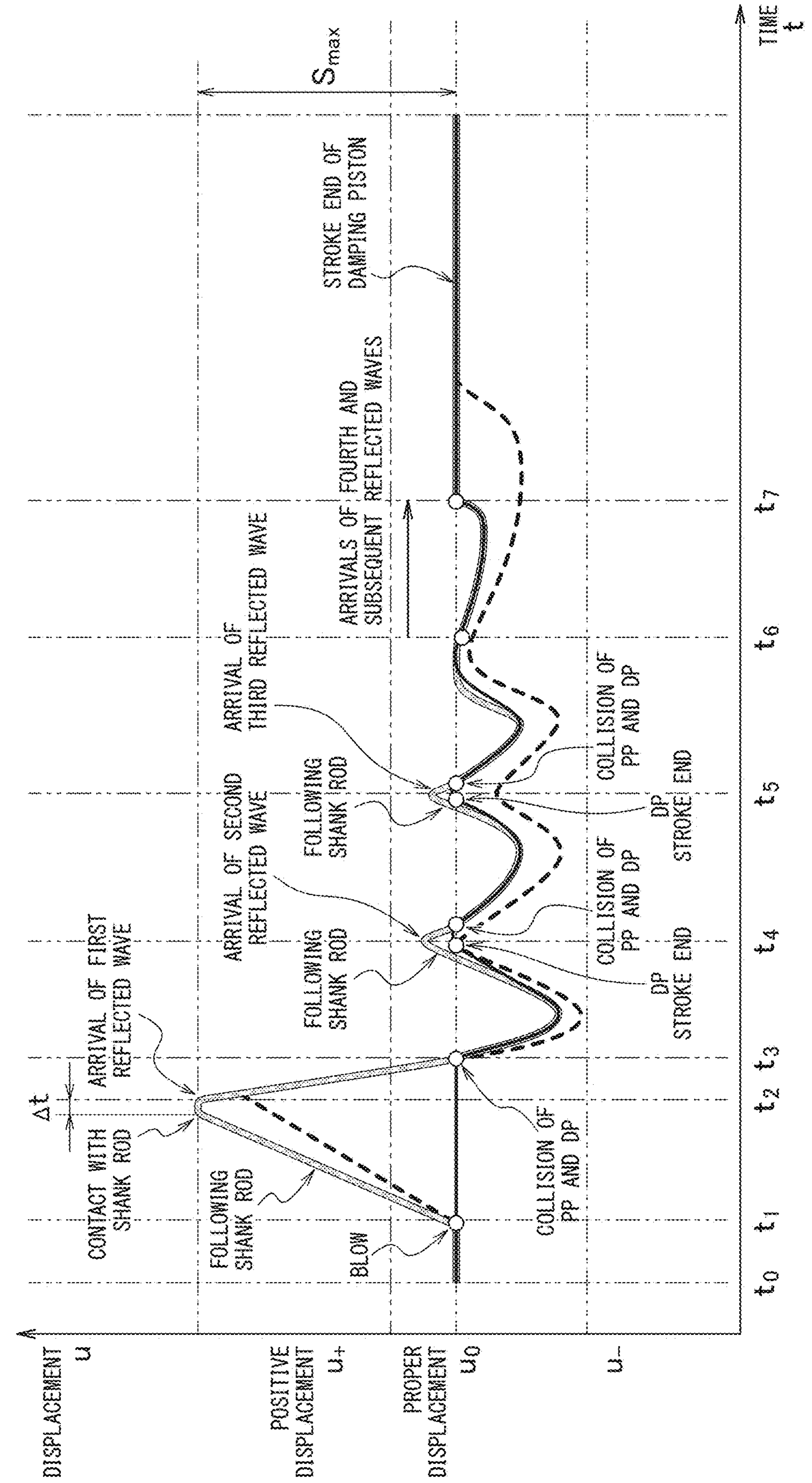
FIG. 3 is an operational explanatory diagram of the cushioning mechanism in FIG. 2 and illustrates a relationship between displacements of the pushing piston (PP) and the damping piston (DP) in the damper-proper state and arrival times of reflected energy.
Figure 4:
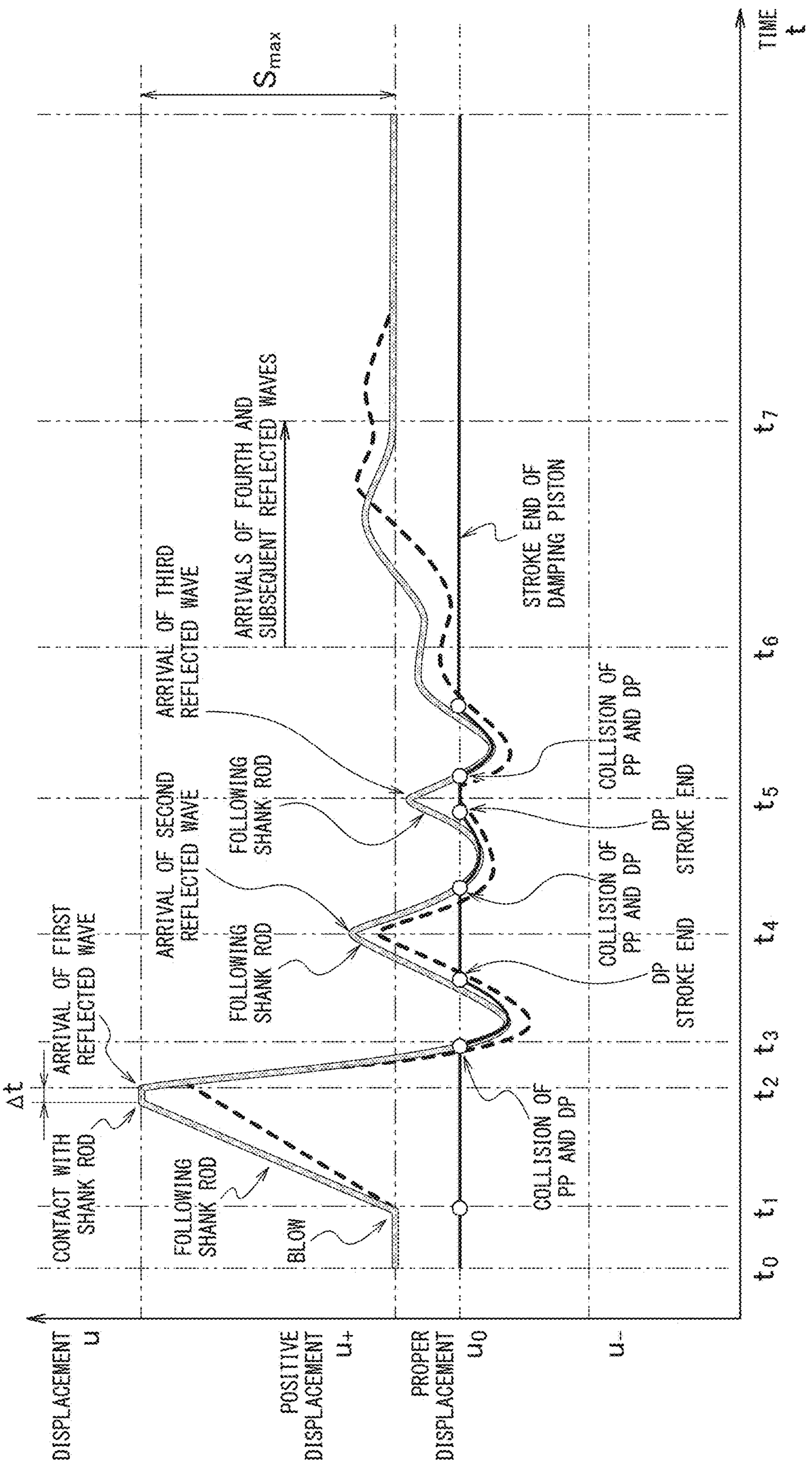
FIG. 4 is another operational explanatory diagram of the cushioning mechanism in FIG. 2 and illustrates a relationship between displacements of the pushing piston (PP) and the damping piston (DP) in the damper-dominant state and arrival times of reflected energy.
Figure 5:
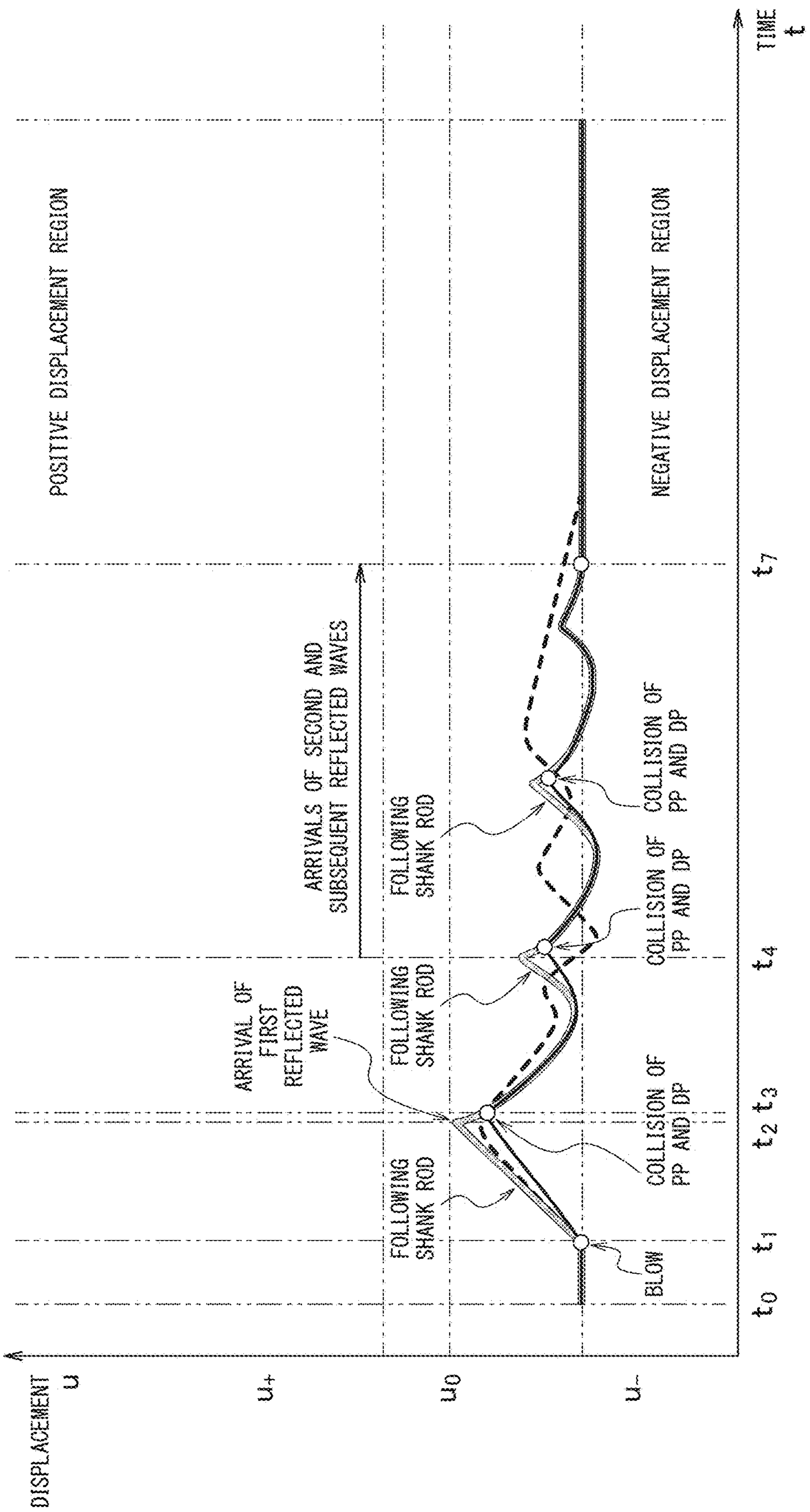
FIG. 5 is still another operational explanatory diagram of the cushioning mechanism in FIG. 2 and illustrates a relationship between displacements of the pushing piston (PP) and the damping piston (DP) in the feed-dominant state and arrival times of reflected energy.
Figure 6:
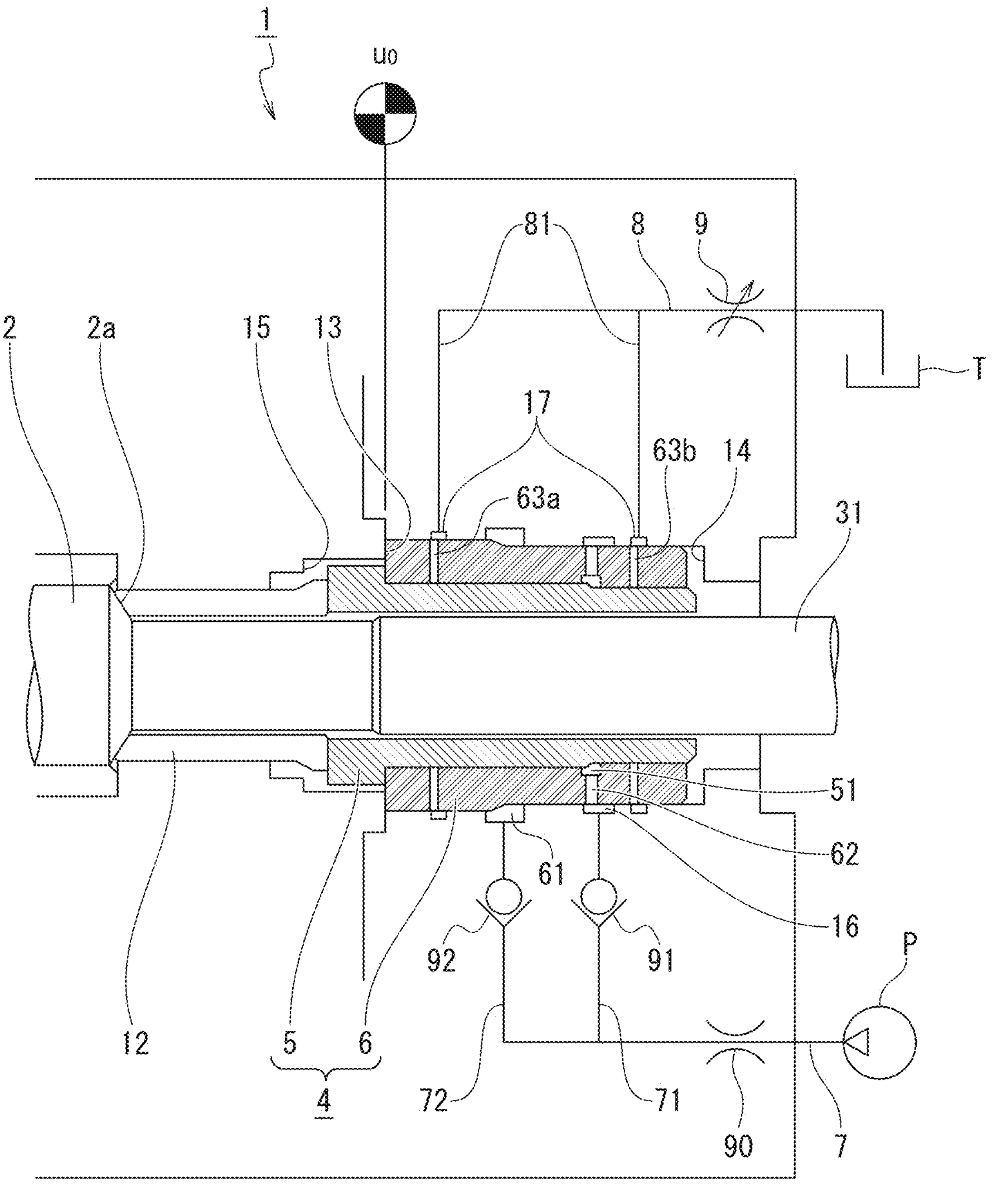
FIG. 6 is a longitudinal sectional view of a cushioning mechanism of a conventional rock drill.

FIGS. 3 to 5 illustrate behaviors of the pushing piston 5 and the damping piston 6 after the hydraulic hammering device of the present embodiment strikes a blow in the damper-proper state, the damper-dominant state, and the feed-dominant state of the dual damper 4, respectively. In addition, behaviors of the dual damper 4 of the prior art are illustrated in the same drawings for comparison.

The ordinates in the drawings represent displacement of the pushing piston 5 and the damping piston 6. The position of the front end of the damping piston 6 when the damping piston 6 is in a state of coming into contact with the middle step section 13, which is the advancing stroke end of the damping piston 6, is defined as the reference position u0. Displacement in the forward direction (the leftward direction in FIGS. 1A to 1C) and displacement in the rearward direction (the rightward direction in FIGS. 1A to 1C) are defined as positive displacement and negative displacement, respectively. Note that in the drawings, the upper side of the reference position u0 and the lower side of the reference position u0 are defined as a positive displacement region and a negative displacement region, respectively.

The abscissae in the drawings represent time, and t1 to t7 are defined as follows:

- t0: an initial time before the striking piston 31 strikes a blow;
- t1: a time when the striking piston 31 strikes a blow on the shank rod 2;
- t2: a time when a first wave of reflected energy arrives at the pushing piston 5;

t3: a time when the pushing piston 5 retracts due to the first wave of reflected energy and comes into contact with the damping piston 6;

t4: a time when a second wave of reflected energy arrives at the pushing piston 5;

t5: a time when a third wave of reflected energy arrives at the pushing piston 5;

t6: a time when fourth and subsequent waves of reflected energy arrive at the pushing piston 5; and t7: a time when all the reflected energy disappears in a stable manner.

The displacement of the pushing piston 5 of the present embodiment is illustrated by a double line provided with shading (hereinafter, refer to as "shaded line"), and the displacement of the damping piston 6 of the present embodiment is illustrated by a solid line.

The displacements of the conventional pushing piston 5 and damping piston 6 are illustrated by a single dashed line without using different line types because the pushing piston 5 separately operates in the positive displacement region, and the pushing piston 5 and the damping piston 6 constantly operate in one body in the negative displacement region.

FIG. 3 illustrates behaviors when the striking piston 31 strikes a blow on the shank rod 2 while the dual damper 4 is in the damper-proper state and subsequently the dual damper 4 cushions reflected energy Er having propagated from transmission tools.

At t0, a rear end section of the pushing piston 5 and a front end section of the damping piston 6 stop at the position u0.

At t1, when the striking piston 31 strikes a blow on the shank rod 2, the shank rod 2 advances forward according to the magnitude of provided blow energy. An advance amount Smax at this time is a maximum displacement of the shank rod in a hammering cycle.

The pushing piston 5 advances following the advancing shank rod 2 and comes to a stop while pressing the shank rod 2. The pressing state appears in the diagram as a flat portion of the shaded line for a time Δt.

At t2, when the first wave of reflected energy Er is transmitted from the shank rod 2 to the pushing piston 5, the pushing piston 5 retracts without delay because the pushing piston 5 had come into contact with and started to press the shank rod 2 at a time the time Δt before t2 and cushions the first wave of reflected energy Er.

At t3, the pushing piston 5 and the damping piston 6 come into contact with each other. Subsequently, the pushing piston 5 and the damping piston 6 retract in one body and cushion the first wave of reflected energy Er.

Although a propulsive force (advancing force) due to hydraulic pressure acts on the pushing piston 5 and the damping piston 6 retracting in one body, the pushing piston 5 and the damping piston 6 turn to an advancing stroke when energy associated with the propulsive force exceeds the reflected energy.

On this occasion, because no throttle is disposed between the pushing piston 5 and a hydraulic source, a larger amount of hydraulic fluid is supplied to the pushing piston 5 than to the damping piston 6. Therefore, an advancing speed of the pushing piston 5 becomes faster than the damping piston 6, and the pushing piston 5 and the damping piston 6 separately advance.

In the meantime, inside the transmission tools, a portion of the reflected energy is reflected by a rear end section of the shank rod 2, propagates to the front side of the transmission tools, is reflected by a front end section of the bit 21, and propagates to the rear side of the transmission tools again as a second wave of reflected energy Er.

At t4, the second wave of reflected energy Er is transmitted to the pushing piston 5.

On this occasion, the pushing piston 5 has advanced beyond the reference position u0 and has been brought into a state of being separated from the damping piston 6. When the reflected energy Er propagates, the pushing piston 5 retracts and cushions the second wave of reflected energy Er.

The pushing piston 5 comes into contact with the damping piston 6, and the pushing piston 5 and the damping piston 6 retract in one body and cushion the second wave of reflected energy Er.

The pushing piston 5 and the damping piston 6 having retracted in one body turn to an advancing stroke when energy associated with the propulsive force thereof exceeds the reflected energy.

On this occasion, because the advancing speed of the pushing piston 5 is faster than advancing speed of the damping piston 6, the pushing piston 5 and the damping piston 6 separately advance. In the meantime, inside the transmission tools, a portion of the reflected energy is reflected by the rear end section of the shank rod 2, propagates to the front side of the transmission tools, is reflected by the front end section of the bit 21, and propagates to the rear side of the transmission tools again as a third wave of reflected energy Er.

At t5, the third wave of reflected energy Er is transmitted to the pushing piston 5.

On this occasion, the pushing piston 5 has advanced beyond the reference position u0 and has been brought into a state of being separated from the damping piston 6. When the reflected energy Er propagates, the pushing piston 5 retracts and cushions the third wave of reflected energy Er.

The pushing piston 5 comes into contact with the damping piston 6, and the pushing piston 5 and the damping piston 6 retract in one body and cushion the third wave of reflected energy Er.

The pushing piston 5 and the damping piston 6 having retracted in one body turn to an advancing stroke when the propulsive force thereof exceeds retracting propulsive force associated with the reflected energy.

On this occasion, because the advancing speed of the pushing piston 5 is faster than advancing speed of the damping piston 6, the pushing piston 5 and the damping piston 6 separately advance.

In the meantime, inside the transmission tools, a reflected wave propagates to the front side of the transmission tools with the rear end section of the shank rod 2 as a free end and propagates to the rear side of the transmission tool again as a fourth wave of reflected energy Er with the front end section of the bit 21 as a free end.

At t6, the fourth wave of reflected energy Er is transmitted to the pushing piston 5.

On this occasion, the pushing piston 5 has the rear end in contact with the front end of the damping piston 6, and a contact surface therebetween is positioned at the reference position u0. When the reflected energy Er propagates, the pushing piston 5 and the damping piston 6 retract in one body and cushion the fourth wave of reflected energy Er.

At t7, the reflected energy Er is damped and dies out by the cushioning action of the dual damper 4.

A positive gradient of the shaded line is steeper than the dashed line, and it can be seen that the advancing speed of the pushing piston 5 in an embodiment according to the present invention is faster than the prior art. In addition, when phases in which the second and third waves of reflected energy Er are transmitted are compared between an embodiment according to the present invention and the prior art, it can be seen that in the embodiment according to the present invention, a cushioning action is exerted without delay because the pushing piston 5 is located in the positive displacement region.

Further, when focusing on the behavior of the damping piston 6, depths of valleys of the curve in the negative displacement region in an embodiment according to the present embodiment are shallower than that in the prior art, and it can be seen that the cushioning action is reinforced. It can be seen that an embodiment of the present invention causes the reflected energy to die out faster than the prior art and performs the next strike with sufficient margin.

Next, a relationship between the behavior of the dual damper 4 in the damper-proper state and the first to third embodiments will be mentioned.

An advantageous effect that the advancing speed of the pushing piston 5 is considerably improved in a phase until the first wave of reflected energy arrives and an advantageous effect that the advancing speed of the pushing piston 5 is faster than the advancing speed of the damping piston 6 in all phases are advantageous effects associated with the first embodiment.

In addition, an advantageous effect that the pushing piston 5 is located in the positive displacement region in a phase in which the second and third waves of reflected energy are transmitted is an advantageous effect associated with the second embodiment. Further, an advantageous effect that the pushing piston 5 has advanced the same distance as the maximum displacement amount of the shank rod 2 and stopped in a phase in which the first reflected energy arrives is an advantageous effect associated with the third embodiment.

FIG. 4 illustrates behaviors when the striking piston 31 strikes a blow on the shank rod 2 while the dual damper 4 is in the damper-dominant state and subsequently the dual damper 4 cushions reflected energy Er having propagated from the transmission tools.

A difference from the damper-proper state is that the striking piston 31 strikes a blow on the shank rod 2 at a position where the rear end of the pushing piston 5 has advanced beyond the reference position u0. Note that because behaviors of the pushing piston 5 and the damping piston 6 are similar to those in the damper-proper state, a detailed description thereof is omitted.

Next, a relationship between the behavior of the dual damper 4 in the damper-dominant state and the first to third embodiments will be mentioned.

An advantageous effect that the advancing speed of the pushing piston 5 is considerably improved in a phase until the first wave of reflected energy arrives and an advantageous effect that the advancing speed of the pushing piston 5 is faster than the advancing speed of the damping piston 6 in all phases are advantageous effects associated with the first embodiment.

In addition, an advantageous effect that the pushing piston 5 advances further than the conventional dual damper 4 in a phase in which the second and third waves of reflected energy arrive is an advantageous effect associated with the second embodiment. Further, an advantageous effect that the pushing piston 5 has advanced the same distance as the maximum displacement amount of the shank rod 2 and stopped in a phase in which the first reflected energy arrives is an advantageous effect associated with the third embodiment.

FIG. 5 illustrates behaviors when the striking piston 31 strikes a blow on the shank rod 2 while the dual damper 4 is in the feed-dominant state and subsequently the dual damper 4 cushions reflected energy Er having propagated from the transmission tools.

A difference from the damper-proper state is that the striking piston 31 strikes a blow on the shank rod 2 at a position where the pushing piston 5 and the damping piston 6 retract in one body beyond the reference position u0 and that the pushing piston 5 and the damping piston 6 operate in the negative displacement region.

Because the feed-dominant state is not an environment where the cushioning action and the pushing action of the dual damper 4 can be sufficiently exerted, it is reasonable that comparing an embodiment according to the present invention with the prior art and asserting superiority of the embodiment as in the cases of the damper-proper state and the damper-dominant state are difficult. However, even in the case of the feed-dominant state, it can be clearly seen that when the pushing piston 5 advances, the pushing piston 5 is separated from the damping piston 6, that is, the advancing speed of the pushing piston 5 is faster than the advancing speed of the damping piston 6.

Next, a relationship between the behavior of the dual damper 4 in the feed-dominant state and the first to third embodiments will be mentioned.

An advantageous effect that the advancing speed of the pushing piston 5 is faster than the advancing speed of the damping piston 6 in substantially all the phases is an advantageous effect associated with the first embodiment. In addition, an advantageous effect that the pushing piston 5 is separated from the damping piston 6 in phases in which the first, second, and third waves of reflected energy are transmitted is an advantageous effect associated with the second implementation. In the feed-dominant state, no advantageous effect associated with the third implementations is exerted.

Variation

A variation of the present invention will be described below using FIG. 7 with reference to FIGS. 1A to 1C and FIGS. 2 to 6.

Figure 7:
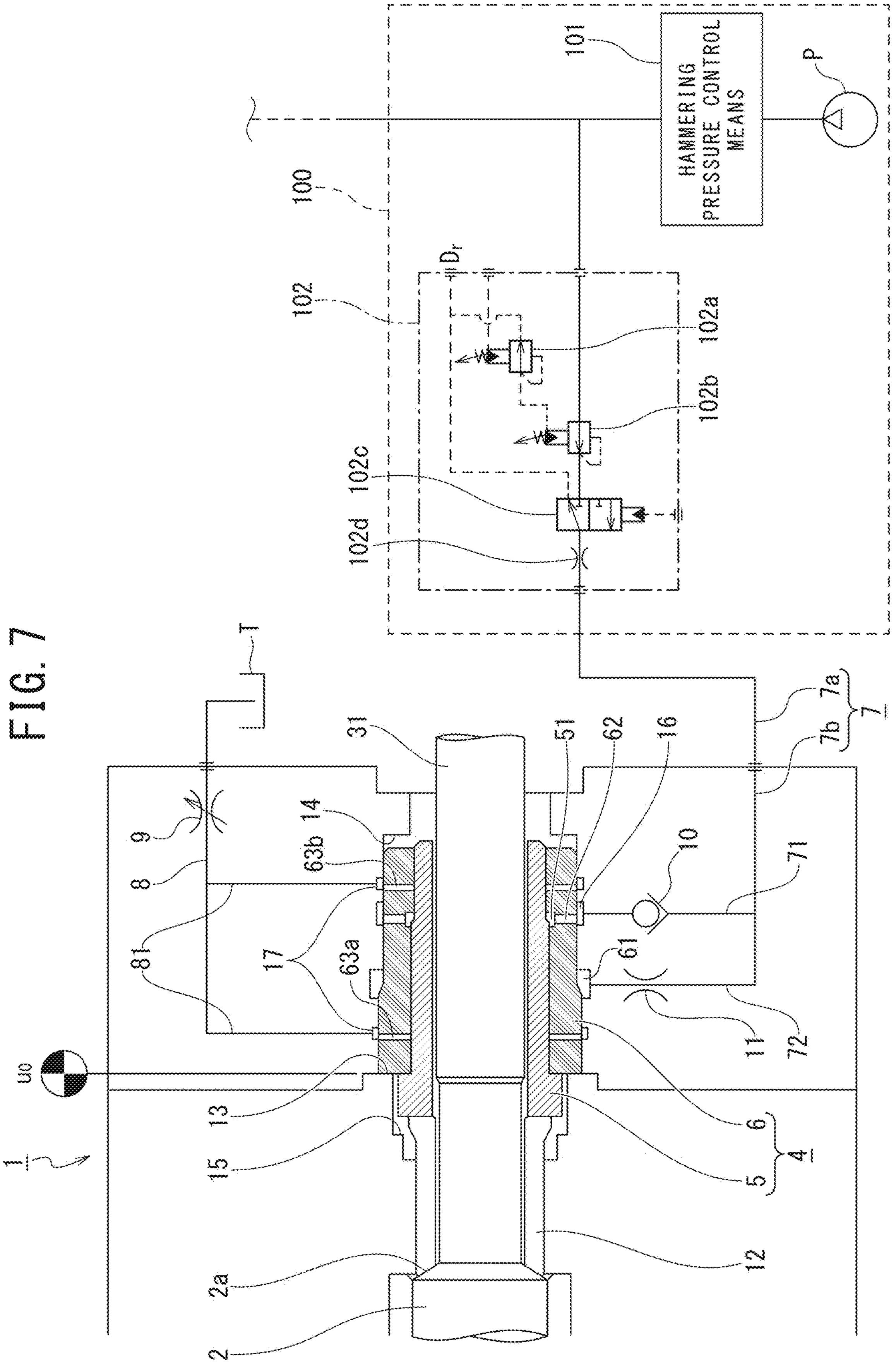
FIG. 7 is a longitudinal sectional view of a cushioning mechanism of a rock drill indicative of a variation of an embodiment of the present invention.

A hydraulic hammering device of the variation includes, as illustrated in FIG. 7, the above-described pushing piston 5, damping piston 6, pushing chamber 51, damping chamber 61, drain circuit 8, first throttle (variable throttle) 9, pushing passage 71, damping passage 72, and high-pressure circuit 7 (e.g. the drain circuit is provided in constant isolation from the pushing chamber and the damping chamber). In addition to the above, the hydraulic hammering device of the variation includes, as illustrated in FIG. 7, a damper pressure source 100.

The damper pressure source 100 includes a hydraulic pump P that is shared by a plurality of pieces of hydraulic equipment. Further, the damper pressure source 100 includes a hammering pressure control means 101 and a damper pressure control means 102.

The hammering pressure control means 101 controls pressure of hydraulic fluid to be supplied from the hydraulic pump P to the hammering mechanism 3.

The damper pressure control means 102 is connected to the hydraulic pump P by way of the hammering pressure control means 101, and hydraulic fluid having pressure controlled by the hammering pressure control means 101 is supplied to the damper pressure control means 102.

In addition, the damper pressure control means 102 includes a first decompression valve 102*a*, a second decompression valve 102*b*, a pilot operation switching valve 102*c*, and a throttle 102*d*.

The first decompression valve 102*a* is a decompression valve configured to control pilot pressure to be supplied to the second decompression valve 102*b* based on feed pressure of the feed mechanism that provides the rock drill main body 1 with a forward propulsive force.

The second decompression valve 102*b* is a decompression valve configured to control hydraulic fluid to be supplied from the hydraulic pump P to the dual damper 4 by way of the hammering pressure control means 101 to a damper pressure. Control of the hydraulic fluid is based on the pilot pressure supplied from the first decompression valve 102*a*.

The pilot operation switching valve 102*c* is a switching valve that is provided on the downstream side of the second decompression valve 102*b* and that is configured to selectively switch connections of the high-pressure circuit 7 to a drain Dr and to the second decompression valve 102*b*.

Although the pilot operation switching valve 102*c* communicates the high-pressure circuit 7 with the drain Dr when a rotation mechanism configured to rotate the shank rod 2 does not operate, the pilot operation switching valve 102*c* communicates the high-pressure circuit 7 with the second decompression valve 102*b* when the rotation mechanism operates, and pilot pressure based on rotational pressure is supplied.

The throttle 102*d* is interposed between the pilot operation switching valve 102*c* and the high-pressure circuit 7 and is a throttle configured to protect hydraulic control equipment from shock of hydraulic fluid that, when the dual damper 4 exerts a cushioning action, propagates from the side on which the dual damper 4 is placed to the side on which the damper pressure control means 102 is placed by way of the high-pressure circuit 7.

Both rock drill main bodies 1 of the present embodiments are mounted on a guide shell of a drilling machine (illustration omitted) that includes a known traveling carriage, boom, and guide shell. The hydraulic pump P, the hammering pressure control means 101, and the damper pressure control means 102 are mounted on the traveling carriage.

The damper pressure control means 102 and the rock drill main body 1 are connected to each other by a hose 7*a*, and between a connection point to the hose 7*a* and the pushing passage 71 and the damping passage 72, a main body passage 7*b* is formed. The hose 7*a* and the main body passage 7*b* constitute the high-pressure circuit 7 of the present invention.

As described in the foregoing, the damper pressure source 100 is formed by the hydraulic pump P configured to supply the plurality of pieces of hydraulic equipment with hydraulic fluid, the hammering pressure control means 101 configured to control pressure of hydraulic fluid supplied from the hydraulic pump P to the hammering mechanism 3, and the damper pressure control means 102 configured to further control pressure of hydraulic fluid having pressure controlled by the hammering pressure control means 101 and supply the high-pressure circuit 7 with the hydraulic fluid.

That is, the damper pressure source 100 supplies the pushing chamber 51 and the damping chamber 61 with hydraulic fluid by way of the high-pressure circuit 7.

In addition, in the hydraulic hammering device of a variation, as with the above-described embodiments, only the check valve 10 that, while allowing supply of hydraulic fluid from the damper pressure source 100 to the pushing chamber 51, restricts an outflow of hydraulic fluid from the pushing chamber 51 to the damper pressure source 100 is provided in the supply path of hydraulic fluid including the high-pressure circuit 7 and the pushing passage 71.

Further, in the hydraulic hammering device of the variation, as with the above-described embodiments, only the second throttle (throttle 11) is provided in the supply path of hydraulic fluid including the high-pressure circuit 7 and the damping passage 72.

Although embodiments of the present invention were described above with reference to the accompanying drawings, the hydraulic hammering device according to the present invention is not limited to the above-described embodiments, and it is apparent that, unless departing from the scope of the present invention, other various modifications and alterations to the respective components can be made.

The following is a list of reference signs used in this specification and in the drawings.

1 Rock drill main body (device main body of hydraulic hammering device)
2 Shank rod
2*a* Large diameter section rear end
3 Hammering mechanism
4 Dual damper
5 Pushing piston
6 Damping piston
7 High-pressure circuit
7*a* Hose
7*b* Main body passage
8 Drain circuit
9 Variable throttle (first throttle)
10 Check valve
11 Throttle (second throttle)
12 Bush
13 Middle step section (reference position)
14 Rear step section
15 Front step section
16 Pushing port
17 Drain port
21 Bit
22 Rod
23 Sleeve
31 Striking piston
51 Pushing chamber
61 Damping chamber
62 Fluid feeding hole
63*a*, 63*b* Drain hole
71 Pushing passage
72 Damping passage
81 Drain passage
90 Throttle
91 Check valve
92 Check valve
100 Damper pressure source
101 Hammering pressure control means
102 Damper pressure control means
102*a* First decompression valve
102*b* Second decompression valve
102*c* Pilot operation switching valve
102*d* Throttle
Er Reflected energy
P Hydraulic pump
R Bedrock
Smax Shank rod maximum displacement amount (advance amount)
T Tank
U Displacement of dual damper
u+ Positive displacement
u− Negative displacement
u0 Reference position

The invention claimed is:

1. A hydraulic hammering device comprising:

a transmission member configured to transmit a propulsive force toward a crushing target side to a tool;

a hammering mechanism configured to strike a blow on a rear portion of the transmission member;

a pushing piston disposed immediately behind the transmission member, the pushing piston having a smaller propulsive force than a propulsive force of a device main body of the hydraulic hammering device;

a damping piston positioned behind the pushing piston and disposed to slide reciprocally against the pushing piston in forward and backward directions, the damping piston having a greater propulsive force than the propulsive force of the device main body of the hydraulic hammering device;

a pushing chamber configured to generate a propulsive force in the pushing piston;

a damping chamber configured to generate a propulsive force in the damping piston;

a damper pressure source configured to supply the pushing chamber and the damping chamber with hydraulic fluid by way of a high-pressure circuit;

a drain circuit provided in constant isolation from the pushing chamber and the damping chamber and configured to discharge a leakage of hydraulic fluid from a location of sliding contact between the pushing piston and the damping piston to a tank;

a first throttle interposed in the drain circuit;

a pushing passage connecting the pushing chamber and the high-pressure circuit; and a damping passage connecting the damping chamber and the high-pressure circuit, wherein in a supply path of hydraulic fluid from an outlet for hydraulic fluid of the damper pressure source to the pushing chamber by way of the high-pressure circuit and the pushing passage, only a check valve configured to, while allowing supply of hydraulic fluid from the damper pressure source to the pushing chamber, restrict an outflow of hydraulic fluid from the pushing chamber to the damper pressure source is provided as a hydraulic fluid control element, and in a supply path of hydraulic fluid from the outlet for hydraulic fluid of the damper pressure source to the damping chamber by way of the high-pressure circuit and the damping passage, only a second throttle is provided as a hydraulic fluid control element.

2. The hydraulic hammering device according to claim 1, wherein after the hammering mechanism strikes a blow on the transmission member, the pushing piston advances following the transmission member, the transmission member advancing before the pushing piston, and when reflected energy propagating from the tool to a device main body of the hydraulic hammering device arrives at the pushing piston, the pushing piston and the damping piston are separated from each other.

3. The hydraulic hammering device according to claim 1, wherein after the hammering mechanism strikes a blow on the transmission member, only the pushing piston advances relative to the damping piston that stops at an advancing stroke end, such that the pushing piston follows the transmission member, the transmission member advancing preceding-before the pushing piston, and before a timing when first reflected energy propagating from the tool to a device main body of the hydraulic hammering device arrives at the pushing piston, the pushing piston comes into contact with a rear portion of the transmission member and presses the transmission member.

4. The hydraulic hammering device according to claim 2, wherein after the hammering mechanism strikes a blow on the transmission member, only the pushing piston advances relative to the damping piston that stops at an advancing stroke end, such that the pushing piston follows the transmission member, the transmission member advancing before the pushing piston, and before a timing when first reflected energy propagating from the tool to a device main body of the hydraulic hammering device arrives at the pushing piston, the pushing piston comes into contact with a rear portion of the transmission member and presses the transmission member.

5. The hydraulic hammering device according to claim 1, wherein the first throttle is a variable throttle.

6. The hydraulic hammering device according to claim 1, wherein the damper pressure source includes a hydraulic pump and a decompression means disposed between an outlet for hydraulic fluid of the hydraulic pump and the high-pressure circuit.

7. The hydraulic hammering device according to claim 1, wherein a forward propulsive force F1 provided to the device main body by a feed mechanism, a propulsive force F5f of the pushing piston, and a propulsive force F6f of the damping piston satisfy a relationship $F5f<F1<F6f$.

8. The hydraulic hammering device according to claim 1, wherein the damper pressure source comprises a hydraulic pump configured to supply a plurality of pieces of hydraulic equipment with hydraulic fluid, a hammering pressure control means configured to control pressure of hydraulic fluid supplied from the hydraulic pump to the hammering mechanism, and a damper pressure control means configured to further control pressure of hydraulic fluid having pressure controlled by the hammering pressure control means and supply the high-pressure circuit with the hydraulic fluid.

9. The hydraulic hammering device according to claim 8, wherein the damper pressure control means includes a first decompression valve configured to control pilot pressure based on feed pressure of a feed mechanism, a second decompression valve configured to control hydraulic fluid supplied from the hydraulic pump to a damper pressure based on the pilot pressure supplied from the first decompression valve, a pilot operation switching valve configured to selectively switch connection of the high-pressure circuit to a drain and to the second decompression valve, and a throttle interposed between the pilot operation switching valve and the high-pressure circuit.

* * * * *